Patented Sept. 25, 1934

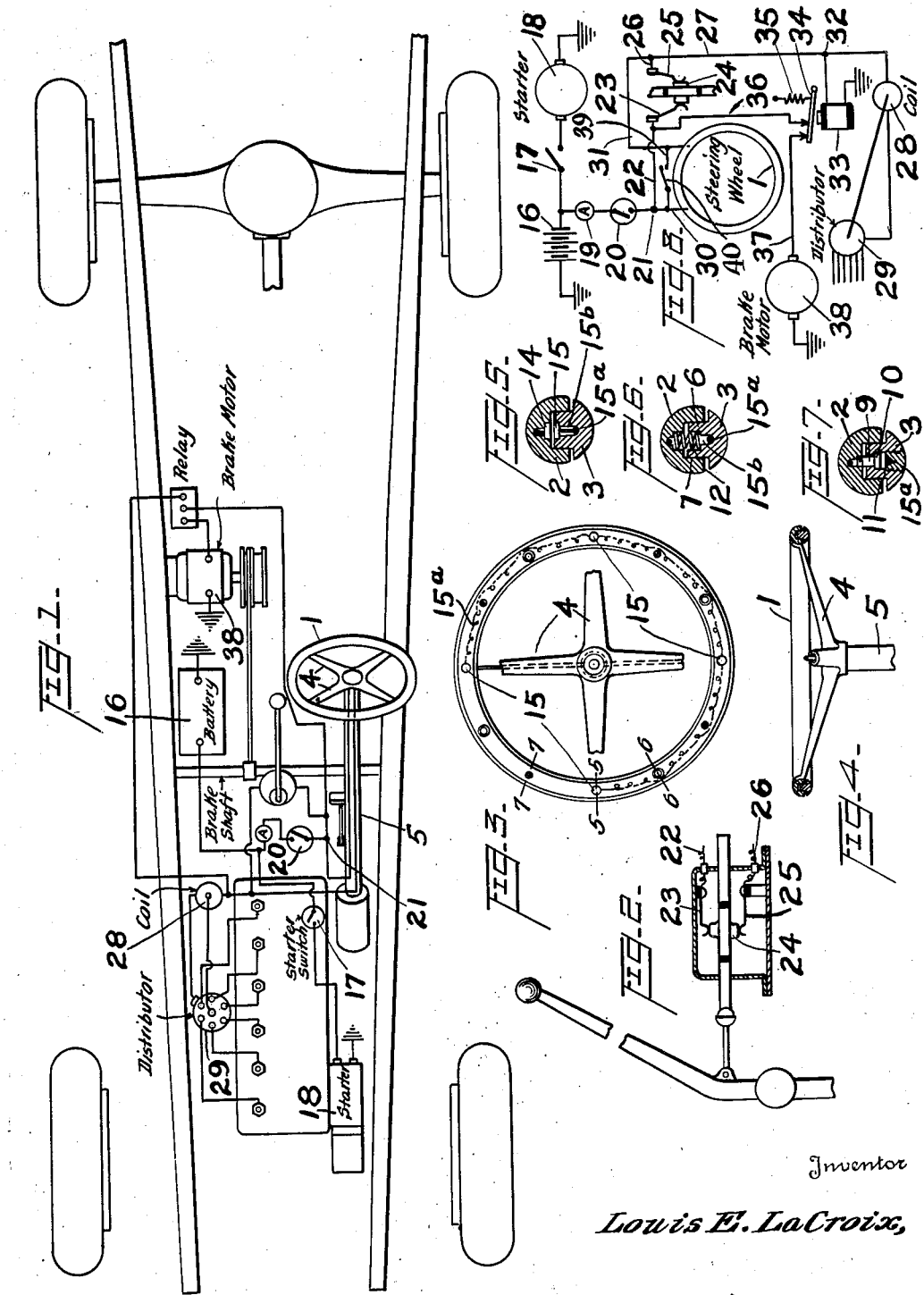

1,974,922

UNITED STATES PATENT OFFICE 1,974,922

SAFETY APPLIANCE FOR AUTOMOBILES

Louis E. La Croix, Baltimore, Md.

Application November 22, 1933, Serial No. 699,263

14 Claims. (Cl. 192—1)

This invention relates to safety mechanism for automobiles and other motor vehicles and has particular reference to the automatic application of the brakes of an automobile when the operator or driver of the vehicle releases his control while the vehicle is in motion.

Among the objects of this invention is to provide an automatic electrically controlled means which will operate upon release of the manual grip of the operator upon the steering wheel of the vehicle.

Another object of this invention is the provision of automatic electric control means associated with the steering wheel of an automobile, said control means being inactive while the steering wheel is manually gripped by the operator while the automobile is in motion but which automatically functions to apply the brakes of the automobile when the grip on the steering wheel is released.

Other, further and more specific objects of this invention will become readily apparent to persons skilled in the art from a consideration of the following description when taken in conjunction with the accompanying drawing, wherein:

Fig. 1 is a diagrammatic view illustrating the relationship of my electrical automatic means for arresting the travel of the vehicle to other electrically operated devices commonly employed in the operation of automobiles.

Fig. 2 is a detail view, partly in section, showing the special electrical circuit which I have provided when the gear shift is in the neutral position.

Fig. 3 is a top-plan view of the lower section of my steering wheel, showing the distribution of the electrical conductors and contact points about this part of the wheel and the disposition of the electric wiring in the steering column and the spokes radiating therefrom to the wheel, the spokes being illustrated fragmentally.

Fig. 4 is a fragmental detail view showing my steering wheel attached to the steering post.

Fig. 5 is a cross-section through the line 5—5 of Fig. 3 and extending through both sections of my steering wheel.

Fig. 6 is a cross-section through the line 6—6 of Fig. 3 and extending through both sections of my steering wheel.

Fig. 7 is a cross-section through the line 7—7 of Fig. 3 and extending through both sections of my steering wheel.

Fig. 8 is an electric diagram showing the passage of the electric circuit through the automatic control means, and the starter of the automobile.

The steering wheel 1 comprises the upper section 2 and the lower section 3. The upper section 2 is connected by means of the spokes 4 to the steering column 5. The lower section 3 is provided with an annular projection 6 which fits into and has a limited movement in the annular groove 7 of the upper section 2. The limitation of movement is governed by a plurality of bolts 9 fastened at one end to the upper section 2, the heads 10 of these bolts 9 being disposed to move within the bores 11 in the lower section 3. The difference between the thickness of the heads 10 and the depth of the bores 11 measures the limit of spacing of the section 3 from section 2. A plurality of springs 12 between the sections 2 and 3 serve to urge section 3 downward and away from section 2. At suitable locations in this wheel there are provided the electrical contact points 14 in the upper section 2 and corresponding electrical contact points 15 in the lower section 3. When section 3 is moved against the tension of the springs 12 to the limit of the inward position of the annular projection 6 in the groove 7, the contact points 15 will engage the corresponding contact points 14. The contact points 14 are all connected in series while the contact points 15 are also connected in series, separately from that of the contact points 14.

The electric conductors 15a from the contact points 15 in the lower section of the steering wheel rest in the narrow grooves 15b. Similar provision is made in the upper section 2 to hold the conductors joining the contact points 14. The bolts 9 which limit the spacing of section 3 from section 2 also prevent circumferential movement of sections 2 and 3 relative to each other.

By reference to Fig. 8 it will be seen that current from the battery 16 travels in one branch through the starting switch 17 to the starter 18 of the automobile. Another branch of the electrical circuit extends through the ammeter 19 and ignition switch 20 to a junction point 21 where it again branches. From this junction point 21 one circuit which affords a by-pass extends through the conductor 22 to the contact spring 23. When the gears are shifted to the neutral position the bridging conductor 24 is brought to the position shown in Figs. 2 and 8 and affords a path for the electric current from the contact spring 23 to the contact spring 25 from which it passes through the conductors 26 and 27, and ignition coil 28 to the distributor 29 of the motor of the vehicle. The other path for the electric current from the junction 21 is through the conductor 30 which passes through the hollow steering column 5, then through one of the spokes 4 to the contacts 14 in the upper section 2 of the steering wheel. When the sections are brought together the contacts 14 and 15 will close the circuit and the current will pass from contacts 14 to contacts 15 from which it will pass through another arm 4 to the conductor 31 extending through the hollow steering column 5. From the conductor 31 the current travels through the conductor 27 to the ignition coil 28 and the distributor 29.

It will be evident that when the section 3 is moved upwardly to the section 2 the electric circuit is established between the battery 16 and the coil 28 and distributor 29 but that when the sections 2 and 3 are separated the circuit is broken. In the latter case, the only path for the current from the battery to the coil 28 and distributor 29 is through the by-pass and the bridge 24 which operates only when the gear-shift is in neutral position. At all other positions of the gear-shift, the path of the current from the battery 16 to the ignition coil 28 and the distributor 29 is by way of the conductors in the sections of the steering wheel.

When electric current is flowing in the conductor 27 to the ignition coil 28, whether across the contacts 14 and 15 or by way of the by-pass, or both, a portion of the current will leave at 32 and serve to energize the magnet 33, which will attract the switch-arm 34 against the tension of the spring 35 and open the circuit which extends from the battery 16, through the conductors 21, 36 and 37 to the brake motor 38. When the flow of current through the conductor 27 is discontinued, either by moving the lower section 3 of the steering wheel from the upper section 2 while the gear-shift is out of neutral position or by moving the gear-shift from the neutral position while the sections 2 and 3 of the wheel are separated and thus breaking the by-pass, the magnet will no longer be able to attract the switch-arm 34 which will be acted upon by the spring 35 to bridge the electric circuit between the conductors 36 and 37 and thereby allow current from the battery 16 to reach the brake motor 38 which will instantaneously operate the brakes of the automobile. Since this instantaneous application of the brakes takes place when the flow of current through the conductor 27 is discontinued, the application of the brakes occurs simultaneously with the stopping of the motor of the vehicle.

It will thus be clearly seen that it is necessary to grip the steering wheel so as to bring the two sections 2 and 3 together in order to keep the car running because, as explained above, the brakes will be instantaneously applied to the automobile and arrest its motion when the operator allows the lower section 3 to separate from the upper section 2 of the steering wheel while the gear-shift lever is in any position other than neutral. Consequently, if for any reason the operator becomes disabled, whether temporarily or permanently through fatigue, drowsiness, injury, etc. or the attention of the operator is distracted for any reason whatsoever, and particularly by an unexpected occurrence, there will be no danger resulting to the driver and other occupants of the car, the vehicle itself or any outside person or object through the operator or driver releasing control of the wheel.

By my new safety device, many of the perils incident to the travel in automobiles and other motor vehicles when the operator is not devoting his attention to the driving and controlling of the vehicle are eliminated.

It is to be understood that provision may be made, as by means of a shunt 39 and a switch 40 to allow current to travel from the conductor 30 to the conductor 31 to permit the operator under special conditions to maintain the vehicle in motion when the grip on the steering wheel is released. However, it is not recommended that such provision be made because of the well-known human tendency to sacrifice safety for convenience, which would prompt certain operators to drive without the safety feature in control.

I have made the upper section of the steering wheel immovable toward the lower section in order to avoid the common danger of an operator, on becoming unconscious or semi-conscious, falling upon the steering wheel and thereby maintaining the electric circuit from the battery to the ignition coil and distributor of the motor, even though the hand grip on the steering wheel is released.

The special safety mechanism of my device is applicable to all types of automobiles and other motor vehicles. With my safety device in operation, the vehicle can move ahead only when the lower section of the steering wheel is brought against the upper section of the steering wheel. Of course, when the gear-shift is in the neutral position the vehicle will not move either forward or backward even though current is passing to the ignition coil and distributor of the motor. If the gear-shift is moved from neutral while the sections of the steering wheel are separated, the brakes will be applied to the vehicle, but just as soon as the steering wheel sections are brought together the magnet will break the electric circuit to the brake motor and the brakes will be released.

It will be clearly seen that with my safety mechanism, the safety features act automatically, simultaneously and instantaneously. All of these are necessary for the proper protection of person and property.

My safety mechanism may be used with the various kinds of brakes now employed on motor vehicles, including mechanical, air, hydraulic and vacuum brakes.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A safety mechanism for automobiles and other motor-driven vehicles provided with a gear shift, a brake, a driving motor and electric circuits supplying current to the motor and to brake-applying means, said safety mechanism comprising a steering wheel including two sections, the lower section of which is movable to and from the upper section, the upper section being non-movable to and from the lower section, means for normally maintaining the sections spaced from each other, electrical contact means on one section registering with corresponding electrical contact means on the other section and adapted to engage said corresponding contact means when the lower section is moved to said upper section, means for instantaneously applying the brake to said vehicle when the sections of said steering wheel are moved from each other, means for by-passing the electric current to the motor of the vehicle when the gear shift of the automobile is in neutral position, said electrical contact means on the sections of the steering wheel being disposed in the electric circuit supplying the current to the driving motor of said vehicle.

2. The combination claimed in claim 1 having included in the means for instantaneously applying the brake to said vehicle a motor for operating said brake and a magnetic switch disposed to instantaneously close the electric circuit supplying current to said brake-applying means when the lower section of the steering wheel moves from the upper section.

3. The combination claimed in claim 1, together with means for maintaining the sections of the steering wheel in fixed circumferential relation to each other.

4. The combination claimed in claim 1, together with means for limiting the spacing of the lower section of the steering wheel from the upper section when the electric circuit to the ignition coil and distributor is broken.

5. The combination claimed in claim 1, together with means for maintaining the sections of the steering wheel in fixed circumferential relation to each other, means for limiting the spacing of the lower section of the steering wheel from the upper section when the electric circuit to the ignition coil and distributor is broken and having a plurality of springs included in the means for normally maintaining the sections spaced from each other.

6. A safety mechanism for automobiles and other motor-driven vehicles provided with a gear shift, a brake, a driving motor and electric circuits supplying current to the motor and to brake-applying means, said safety mechanism comprising a steering wheel including two sections, the lower section of which is supported by and movable to and from the upper section, the upper section being non-movable to and from the lower section, means for normally maintaining the sections spaced from each other, electrical contact means on one section registering with corresponding electrical contact means on the other section and adapted to engage said corresponding contact means when the lower section is moved to said upper section, means for instantaneously applying the brake to said vehicle when the sections of said steering wheel are moved from each other, means for by-passing the electric current to the motor of the vehicle when the gear shift of the automobile is in neutral position, said electrical contact means on the sections of the steering wheel being disposed in the electric circuit supplying the current to the driving motor of said vehicle.

7. A safety mechanism for automobiles and similar vehicles provided with a brake and an electric circuit supplying current to brake-applying means, said safety mechanism comprising a steering wheel including an upper section and a lower section, means for normally maintaining the lower section spaced from the upper section, electrical contact means on one section registering with corresponding electrical contact means on the other section, said lower section being movable to said upper section to effect engagement of the contact means on the two sections, and electrical means controlled by the separation of said contact means for instantaneously applying the brake to said vehicle, said electrical means comprising a motor for operating said brake and a magnetic switch disposed to instantaneously close the electric circuit supplying current to said brake-applying means when the lower section of the steering wheel moves from the upper section.

8. The combination claimed in claim 7, together with means for maintaining the sections of the steering wheel in fixed circumferential relation to each other and means for limiting the spacing of the lower section of the steering wheel from the upper section.

9. A safety mechanism for automobiles and similar vehicles provided with a gear shift, a driving motor, a brake and electric circuits supplying current to the motor and to brake-applying means, said safety mechanism comprising a steering wheel including an upper section and a lower section, the lower section being movable to and from the upper section and the upper section being non-movable to and from the lower section, electrically controlled means actuated by movement of said lower section from said upper section of said steering wheel for instantaneously applying the brake to said vehicle, and means for by-passing the electric current to the motor of the vehicle when the gear shift of the automobile is in neutral position.

10. A safety mechanism for automobiles and other motor driven vehicles provided with a gear shift, a brake, a driving motor and electric circuits supplying current to the motor and to brake-applying means, said safety mechanism comprising a steering wheel including an upper section and a lower section, means for normally maintaining the lower section spaced from the upper section, electrical contact means on one section registering with corresponding electrical contact means on the other section, one of said sections being movable to the other section to effect engagement of the contact means on the two sections, electrically controlled means actuated by the separation of said contact means for instantaneously applying the brake to said vehicle, said electrical contact means being disposed in the electric circuit supplying current to the driving motor of the vehicle, and means for by-passing the electric current to the motor of the vehicle when the gear shift of the automobile is in neutral position.

11. A safety mechanism for automobiles and similar vehicles provided with a gear shift, a driving motor, a brake and electric circuits supplying current to the motor and to brake-applying means, said safety mechanism comprising a steering wheel including an upper section and a lower section, means for normally maintaining the lower section in its lowermost position and spaced from the upper section, electrical contact means on one section registering with corresponding electrical contact means on the other section, said lower section being movable to said upper section to effect engagement of the contact means on the two sections, means for preventing engagement of the corresponding contact means when the lower section is in its lowermost position, electrically controlled means actuated by the separation of said contact means for instantaneously applying the brake to said vehicle, and means for by-passing the electric current to the motor of the vehicle when the gear shift of the automobile is in neutral position.

12. A safety mechanism for automobiles and other motor-driven vehicles provided with a gear shift, a brake, a driving motor and an electric circuit supplying current to the motor, said safety mechanism comprising a steering wheel including an upper section and a lower section, the lower section being movable to and from the upper section and the upper section being non-movable to and from the lower section, electrical means controlled by movement of said lower section from and to said upper section for respectively opening and closing the electric circuit supplying the current to the motor, electrical means simultaneously controlled by movement of said lower section from said upper section of said steering wheel for applying the brake to said vehicle when the electric circuit to said motor is opened by separation of the sections of said steering wheel, and means for by-passing the electric current to the motor of the vehicle when the gear shift of the automobile is in the neutral position.

13. A safety mechanism for automobiles and other motor-driven vehicles provided with a gear shift, a brake, a driving motor and electric circuits supplying current to the motor and to brake-applying means, said safety mechanism comprising a steering wheel including two sections, the lower section of which is movable to and from the upper section, the upper section being non-movable to and from the lower section, means for normally maintaining the sections spaced from each other, electrical contact means on one section registering with corresponding electrical contact means on the other section and adapted to engage said corresponding contact means when the lower section is moved to said upper section, said electrical contact means on the sections of the steering wheel being disposed in the electric circuit supplying the current to the driving motor of said vehicle, and means for instantaneously applying the brake to said vehicle when the sections of said steering wheel are moved from each other, said latter means comprising a coil receiving electric current when the sections of the steering wheel are together and being demagnetized when the sections of the steering wheel are moved from each other, an electric switch operated by said coil and disposed to close the electric circuit supplying current to the brake-applying means when the supply of current to said coil is cut off, and a motor in said latter circuit for operation of said brake.

14. A safety mechanism for automobiles and other motor-driven vehicles provided with a gear shift, a brake, a driving motor and electric circuits supplying current to the motor and to brake-applying means, said safety mechanism comprising a steering wheel including two sections, the lower section of which is movable to and from the upper section, the upper section being non-movable to and from the lower section, means for normally maintaining the sections spaced from each other, electrical contact means on one section registering with corresponding electrical contact means on the other section and adapted to engage said corresponding contact means when the lower section is moved to said upper section, said electrical contact means on the sections of the steering wheel being disposed in the electric circuit supplying the current to the driving motor of said vehicle, and means for instantaneously applying the brake to said vehicle when the sections of said steering wheel are moved from each other, said latter means comprising a motor for operating said brake and a magnetic switch disposed to instantaneously close the electric circuit supplying current to the brake-applying means when the lower section of the steering wheel moves from the upper section.

LOUIS E. LA CROIX.